United States Patent [19]  [11] Patent Number: 4,565,211
Denney  [45] Date of Patent: Jan. 21, 1986

[54] HYDRAULIC MANIFOLD WITH AUTOMATIC FLOW CONTROL

[75] Inventor: Raymond E. Denney, Jackson, Mich.

[73] Assignee: Aeroquip Corporation, Jackson, Mich.

[21] Appl. No.: 572,814

[22] Filed: Jan. 23, 1984

[51] Int. Cl.⁴ .............................................. F16K 43/00
[52] U.S. Cl. ................... 137/321; 251/149.6; 251/215; 251/253; 251/256
[58] Field of Search ............... 251/149.4, 149.6, 149.7, 251/253, 256, 213, 215; 137/321, 322, 625.48; 74/25, 99 R

[56] References Cited
U.S. PATENT DOCUMENTS 611,276 9/1898 Reimold ................................. 137/321
3,450,382 6/1969 Calim ..................................... 251/256

FOREIGN PATENT DOCUMENTS 43760 9/1888 Fed. Rep. of Germany ... 251/149.4
610915 6/1926 France ............................. 137/625.48
1284711 1/1962 France ................................. 251/256

Primary Examiner—Samuel Scott
Assistant Examiner—Noah Kamen
Attorney, Agent, or Firm—Beaman & Beaman

[57] ABSTRACT

An access fitting for a hydraulic system including a valve element shiftable to a sealing or blocking position within the hydraulic circuit upon a conduit being attached to the access fitting wherein the valve element automatically seals a portion of the hydraulic circuit from the access conduit when attached to the access fitting.

4 Claims, 5 Drawing Figures

HYDRAULIC MANIFOLD WITH AUTOMATIC FLOW CONTROL

BACKGROUND OF THE INVENTION

In some hydraulic circuits it is desired to temporarily connect pressure or test circuits to the hydraulic system for leak checking, pressure checks, or other test purposes. For instance, some aircraft hydraulic circuits require ground support pressure checks, and access fitting manifolds are used for such purpose.

With some circuits utilizing a pump, the attachment to the access fitting of a pressurized test conduit has a detrimental effect on the pump, such as producing "motoring" of the pump. In such instance, it is necessary to temporarily exclude the pump from the hydraulic circuit being tested, and while check valves have been used for this purpose they are often unsatisfactory because of the occurrence of cavitation during normal circuit use.

It is an object of the invention to provide an access fitting and valve for a hydraulic manifold wherein operation of the access valve produces an automatic control of the flow path of the manifold.

A further object of the invention is to provide an access fitting for a hydraulic manifold wherein connection of a conduit to the access fitting displaces a valve element which seals portions of the manifold hydraulic circuit, and permits other portions of the hydraulic circuit to communicate with the conduit attached to the access fitting.

An additional object of the invention is to provide a hydraulic manifold with an automatic flow control access fitting wherein the access fitting components may be installed and removed as a cartridge assembly for simplifying maintenance and assembly.

In the practice of the invention a hydraulic circuit includes a manifold having a flow passage defined therein and an access fitting is incorporated into the manifold body for selective attachment of a pressure check conduit thereto.

The access fitting includes a passage which intersects the manifold's flow passage at right angles and a valve element is displaceable within the fitting passage between a blocking position which seals the manifold flow passage, and an open position which permits fluid flow through the manifold flow passage and seals the access fitting passage. Attachment of a conduit to the access fitting automatically displaces the valve element between its two positions, and movement of the valve element to seal the access fitting upon removal of the test conduit is augmented by a compression spring.

The valve element includes a bypass passage, and key structure is utilized with the valve causing the valve to rotate about its axis through 90° as the valve element is displaced from its access fitting sealing position to its manifold flow passage blocking position. When in the blocking position the bypass passage communicates with a selective portion of the hydraulic circuit flow passage.

The structure of the access fitting, including the valve element, are assembled within a cartridge and the apparatus of the invention may be quickly removed or installed into the manifold body.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
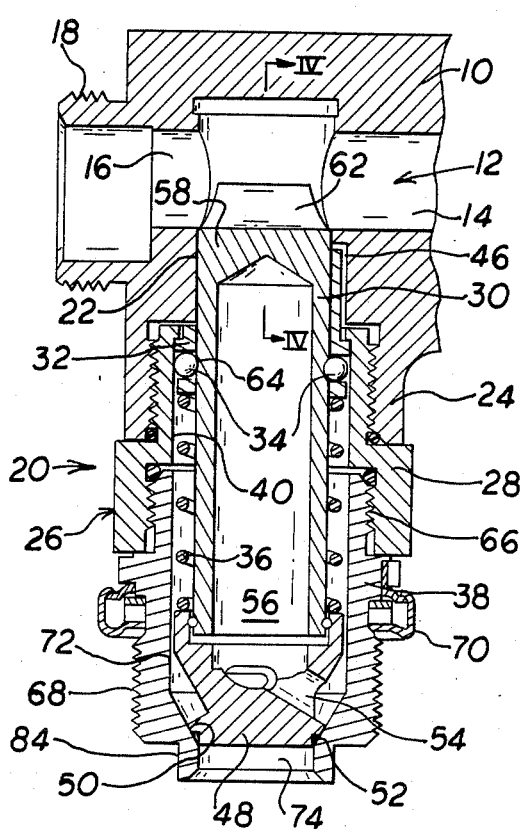
FIG. 1 is an elevational, diametrical, sectional view of a hydraulic manifold and automatically operated access fitting illustrating the valve element in the non-use or open position.

A manifold body is represented at 10, and constitutes a component within a hydraulic circuit. The body 10 includes a flow passage 12 having a portion 14 which communicates with the primary portion of the hydraulic circuit and a portion 16 in communication with a pump, not shown, for supplying pressure to the hydraulic circuit. The body includes a threaded boss 18 whereby a conduit from the pump may be attached thereto, and in the normal operation of the hydraulic circuit, pressurized fluid from the pump enters the passage portion 16 and flows into the flow passage portion 14 to the other circuit components.

As it is desired to periodically attach pressure check apparatus to the manifold body to evaluate the hydraulic characteristics of the components in communication with the passage portion 14, an access fitting generally indicated at 20 is formed on the body 10, and as will be later described, permits testing apparatus to communicate with the manifold flow passage portion 14.

The access fitting 20 includes a fitting passage 22 having an axis perpendicularly disposed to the flow passage 12 and symmetrically intersecting the flow passage. The passage 22 is of a greater diameter than passage 12 and includes an internally threaded annular projection 24 for receiving the cartridge 26 which basically consists of the sleeve 28, valve element 30, key sleeve 32, ball keys 34 and compression spring 36.

An adapter 38 threadedly connects to the cartridge 26 for permitting the pressure check coupling and conduit to be attached to the access fitting, as described below.

The sleeve 28 is exteriorly threaded for cooperation with the threads 24, and includes a cylindrical bore 40 in which the annular key sleeve 32 is received. The key sleeve 32 includes a pair of diametrically opposed holes 42 in which balls 34 are freely radially movable, and an axially extending projection 44 defined upon the key sleeve enters a key slot 46 defined in the access fitting passage 22 rotationally orienting the key sleeve and balls to the manifold and flow passage 12.

The elongated valve element 30 is located within the sleeve 28 and is axially displaceable therein. The valve element is closed at its outer end by a head 48 upon which the seat 50 is formed which includes an annular elastomer sealing ring 52, such as an O-ring. Several passages 54 are defined in the head 48 extending therethrough communicating with the valve element central bypass passage 56. At its inner end the valve element 30 is closed at 58 and passage 60 establishes communication between the central passage 56 and the lateral side of the valve element adjacent the end 58.

Figure 4:
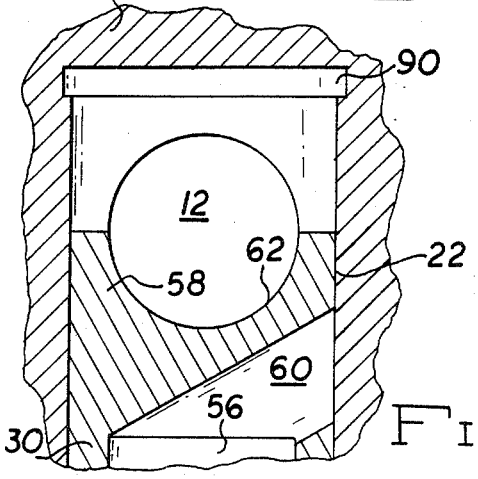
FIG. 4 is an elevational, sectional, enlarged, detail view as taken along Section IV—IV of FIG. 1.
Figure 5:
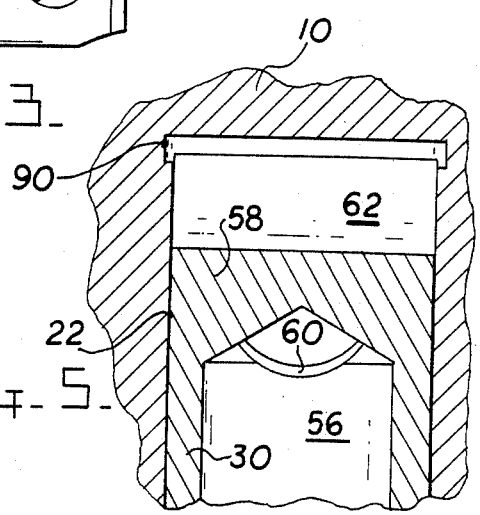
FIG. 5 is an elevational, enlarged, detail, sectional view as taken along Section V—V of FIG. 2.

As will be appreciated from the drawings, the valve element inner end 58 is formed with concave cylindrical segment 62 corresponding to the radius of the manifold flow passage 12, FIG. 4.

Figure 3:
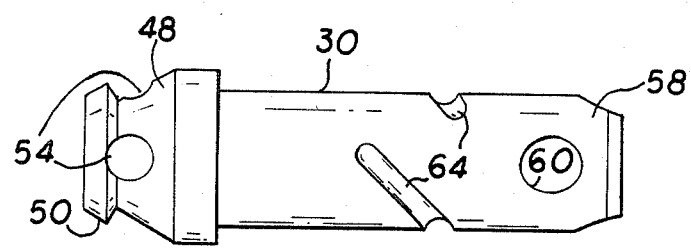
FIG. 3 is an elevational view of the valve element, per se.

A pair of spiral key grooves 64 are formed in the outer surface of the valve element 30, as will be appreciated from FIG. 3, and the balls 34 each cooperate with a spiral groove to establish a mechanical interconnection between the valve element and the key sleeve 32.

Compression spring 36 is interposed between the key sleeve 32 and the valve element head 48 which biases the valve element away from the flow passage 12.

The adapter 38 is externally threaded for cooperation with the internal threads 66 defined upon the sleeve 28, and a seal ring assures a sealed connection between the adapter and the sleeve. The adapter is externally threaded at 68, and coupling locking structure 70 may be defined upon the adapter for cooperation with the coupling lock structure of the test conduit which is attached to the adapter. Internally, the adapter 38 is provided with a cylindrical surface 72 coaxial and aligned with the sleeve bore, and an inlet port 74 is defined at the outer end of the adapter adjacent the conical seating surface 76.

In normal use of the hydraulic circuit, the components will be in the relationship shown in FIG. 1. The spring 36 will bias the valve element 30 away from the flow passage 12 causing the O-ring 52 on the head seat 50 to engage the adapter sealing surface 76 thereby sealing the access fitting inlet port 74. Due to the engagement of the balls 34 with the valve element key grooves 64 the valve element 30 will be rotationally oriented as shown in FIG. 4 wherein segment 62 is coaxial with passage 12 and fluid flow through the passage 12 between portions 14 and 16 is unrestricted, and fluid cannot escape through the access fitting 20.

Figure 2:
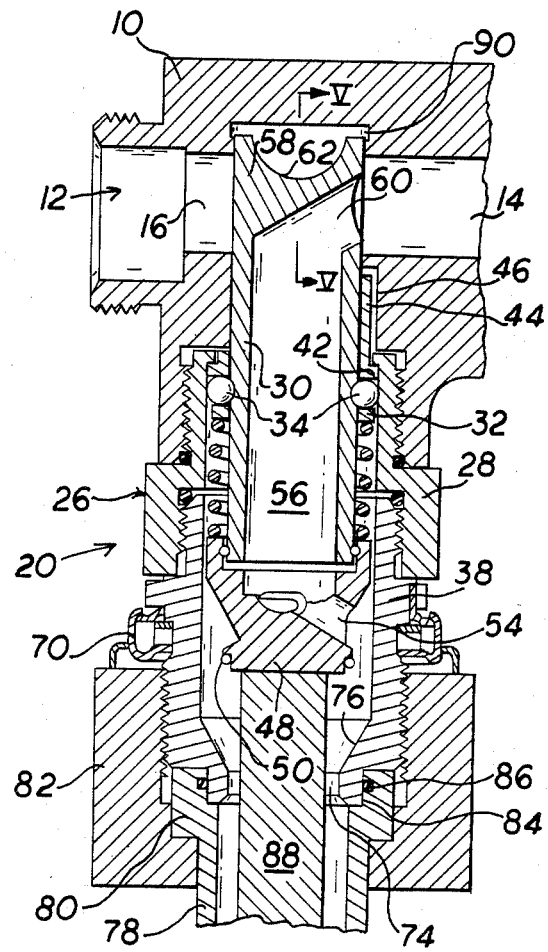
FIG. 2 is an elevational, sectional view similar to FIG. 1 illustrating the valve element in its hydraulic circuit flow passage blocking position with a conduit attached to the access fitting.

When it is desired to subject the hydraulic circuit components to a pressure check or other procedure requiring attachment of a conduit to the access fitting 20, the test pressure conduit 78, FIG. 2, is aligned with the adapter 38 and includes an enlarged head 80 upon which the connecting nut 82 is rotatedly mounted, and the nut threads mate with the adapter threads 68 to draw the conduit head upon the cylindrical surface 84 of the adapter such that the O-ring 86 establishes a seal therebetween. Locking structure defined upon the nut 82 cooperates with the locking apparatus 70 to prevent accidental disassembly of the nut from the adapter.

The conduit 78 includes internal coaxial projection 88 mounted within the conduit upon its spider, not shown, wherein fluid may flow around the projection. As the conduit is attached to the adapter 38 the projection 88 engages the valve element head 48 and moves the valve element 30 toward the flow passage 12 as the nut 82 is being threaded upon the adapter. The full connected condition is shown in FIG. 2 wherein the head seat 50 has been displaced from the adapter seat surface 76, and fluid entering the adapter through the conduit enters the valve element bypass passage 56 through valve element passage 54.

As the valve element 30 is being axially translated by the projection 88 toward the flow passage the spiral configuration of the key grooves 64 rotates the valve element 90° such that when the valve element is in its full blocking position shown in FIG. 2 the passage 60 will be in communication with the manifold flow passage portion 14. At this time the cylindrical end 58 of the valve element has entered the cylindrical recess 90 defined in the manifold in alignment with the fitting passage 22 and as the diameter of the valve element is greater than the diameter of the flow passage the flow passage will be completely blocked with respect to portions 14 and 16 and the pump and components in communication with the flow passage portion 16 will be sealed with respect to the flow passage 14.

Under these conditions the pressurizing of the flow passage 14 through the conduit 78 and valve element 30 will not introduce pressurized fluid into the flow passage 16 to produce "motoring" of the pump, and the pressure check of the system can be accomplished without producing undesirable effects.

After the pressure check has been completed, the nut 82 is unthreaded from the adapter 38 and the conduit 78 removed from the access fitting permitting the valve element 30 to be axially displaced away from the flow passage 12 to the normal condition as shown in FIG. 1. Communication through the flow passage portions 14 and 16 is reestablished, and the hydraulic circuit will function as designed.

The automatic operation of the valve element 30 to seal the flow passage 12 upon attachment of the conduit to the access fitting eliminates monitored operations by the operator, and as the valve element is self-closing, little, if any, loss of fluid occurs during the test cycle.

It is appreciated that various modifications to the inventive concepts may be apparent to those skilled in the art without departing from the spirit and scope of the invention.

I claim:

1. An automatic manifold access and flow control fitting comprising, in combination, a body having a fixed flow passage defined therethrough, a fixed fitting passage defined in said body transversely disposed to and intersecting said flow passage, an inlet port defined in said fitting passage spaced from said flow passage, an elongated tubular valve element axially displaceable within said fitting passage between a fitting sealing position sealing said inlet port at said inlet port and a flow passage blocking position wherein said valve element is located within said flow passage and blocks said flow passage against flow therethrough, a seat defined on said valve element, a seating surface defined in said fitting passage adjacent said inlet port engagable by said valve element seat at said valve element fitting sealing position to seal said inlet port, a bypass passage defined within said valve element having a first port in communication with said inlet port and a second port in communication with said flow passage when said valve element is in said blocking position, conduit attachment means defined upon said body at said inlet port, an abutment defined on said valve element adjacent said inlet port engagable with a conduit to be selectively connected to said inlet port which automatically displaces said valve element from said sealing position to said blocking position, and spring means biasing said valve element toward said sealing position.

2. An automatic manifold access and flow control fitting comprising, in combination, a body having a flow passage defined therein, a fitting passage defined in said body transversely disposed to and intersecting said flow passage, an inlet port defined in said fitting passage spaced from said flow passage, an elongated tubular valve element axially displaceable within said fitting passage between a fitting sealing position sealing said inlet port and a flow passage blocking position wherein said valve element is located within said flow passage and blocks said flow passage against flow therethrough, a bypass passage defined within said valve element having a first port in communication with said inlet port and a second port in communication with said flow passage when said valve element is in said blocking position, said valve element having a cylindrical side surface, said bypass passage second port intersecting said valve element side surface whereby said bypass passage communicates solely with one portion of said flow passage upon said valve element being located within said flow passage at said blocking position, a key groove defined in said valve element side surface, a key within said fitting passage engaging said key groove to orient said valve element and said second port to said flow passage upon said valve element being in said blocking position, conduit attachment means defined upon said body at said inlet port, an abutment defined on said valve element adjacent said inlet port engagable with a conduit to be selectively connected to said inlet port which automatically displaces said valve element from said sealing position to said blocking position, and spring means biasing said valve element toward said sealing position.

3. In a manifold access and flow control fitting as in claim 2, said key groove being of a spiral configuration, and said key comprising a ball whereby said valve element is rotated about its axis as it is translated between said sealing and blocking positions.

4. In a manifold access and flow control fitting as in claim 5, a tubular sleeve mounted within said fitting passage about said valve element, a pair of diametrically related holes defined in said sleeve, a key ball received within each sleeve hole, and a pair of spiral key grooves defined in said valve element each receiving a key hole.

* * * * *